United States Patent
Ercoli et al.

[15] 3,691,214
[45] Sept. 12, 1972

[54] 17-VALERATE ESTER OF 6α,9α-DIFLUOROPREDNISOLONE, ITS COMPOSITIONS AND USE AS AN ANTI-INFLAMMATORY AGENT

[72] Inventors: Alberto Ercoli, Milan; Rinaldo Gardi, Carate Brianza, both of Italy

[73] Assignee: Warner-Lambert Pharmaceutical Company, Morris Plains, N.J.

[22] Filed: June 8, 1970

[21] Appl. No.: 44,560

Related U.S. Application Data

[63] Continuation-in-part of Ser. No. 707,934, Feb. 26, 1968, abandoned.

[52] U.S. Cl.......260/397.45, 260/239.55 D, 424/243
[51] Int. Cl............................................C07c 169/34
[58] Field of Search ......./Machine Searched Steroids

[56] References Cited

UNITED STATES PATENTS

| | | |
|---|---|---|
| 2,838,499 | 6/1958 | Spero et al............260/239.55 |
| 3,152,154 | 10/1964 | Ercoli et al...........260/397.45 |
| 3,297,729 | 1/1967 | Mancini et al..........260/397.4 |
| 3,312,590 | 4/1967 | Elks et al......................167/58 |
| 3,383,394 | 5/1968 | Weber et al..........260/397.45 |

*Primary Examiner*—Henry A. French
*Attorney*—Albert H. Graddis, Henry E. Millson, Jr., Frank S. Chow, Neil D. Edwards and Anne M. Kelly

[57] ABSTRACT

This invention relates to the new 6α,9α-difluoroprednisolone 17-valerate and to pharmaceutical compositions for topical and systemic use of said compound in the treatment of inflammatory conditions.

1 Claim, No Drawings

17-VALERATE ESTER OF 6α,9α-DIFLUOROPREDNISOLONE, ITS COMPOSITIONS AND USE AS AN ANTI-INFLAMMATORY AGENT

This application is a continuation-in-part of application Ser. No. 707,934, filed Feb. 26, 1968 and now abandoned.

The present invention relates to the new 17-valerate of 6α, 9α-difluoroprednisolone, represented by the following structural formula:

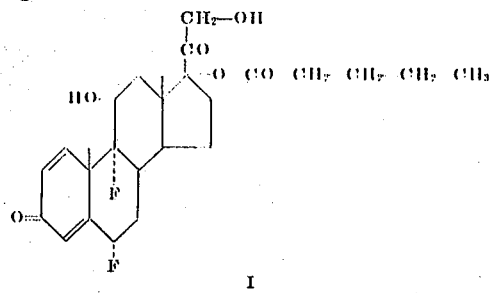

This compound shows anti-inflammatory properties particularly high in comparison with those of the known 6α, 9α-difluoroprednisolone and of its 21-esters. The new 17-valerate ester of this invention possesses the unusual property of being effective for topical and systemic use as an anti-inflammatory steroid in contrast with the hitherto known 17-alkanoate esters of other corticosteroids which are active only when topically administered. Further the new compound of this invention exerts an anti-inflammatory effect by topical application also higher than other closely analogous 17-monoesters.

On account of its properties, the 17-valerate of 6α,9α-difluoroprednisolone in the form of pharmaceutical compositions is particularly suited for the topical and systemic treatment of inflammatory conditions and diseases. The compositions of this invention contain the active steroid in intimate admixture with a suitable carrier or excipient and may be in solid, semisolid, liquir or viscous form. The active ingredient may be compounded, for example, with the usual carriers for tablets, pellets, suppositories, powders, ointments, lotions, creams, emulsions, aqueous suspensions and other forms particularly suitable for systemic or topical use. For the systemic treatment of arthritis and related diseases the compound may be employed in the form of injectable compositions for intramuscular, subcutaneous or intravenous use.

Preferably, the active steroid is formulated into a topical preparation. The carriers employed are those which have already been proposed for use in manufacturing preparations for topical use, such as for example fats of animal origin and vegetable oils, saturated or unsaturated fatty acids, aluminum stearate, alcohols, polyalcohols, such as for example glycerol, propylene or polyethylene glycols, waxes, aliphatic hydrocarbons or lanolin, together with comparatively high quantities of water. Other carriers which can be used are hydrophilic bases, cholesterol, hydroxycholesterol, vaseline, vaseline oil, silicones which are physiologically inert, sodium alginate and in addition stabilizing, thickening and coloring agents and perfumes. The compositions of the present invention can also contain preservative or bacteriostatic agents such as for example esters of p-hydroxy benzoic acid, i.e. methyl-, ethyl-or propyl-p-hydroxy benzoate, mercuric derivatives such as for example the merthiolate, or quaternary ammonium derivatives such as for example cetyl-trimethyl-ammonium bromide, which besides the surface active action possess a good bacteriostatic activity.

Other active ingredients compatible with the new steroid of this invention, such as for example antibiotics, local anesthetics of sulphonamides can also be incorporated in the topical anti-inflammatory compositions if these added properties or characteristics are desired.

The 17-valerate ester of 6α,9α-difluoroprednisolone is included in the compositions of this invention in an amount sufficient to produce the desired therapeutic effect upon the inflammatory process or condition. Advantageously the compositions will contain the active ingredient in an amount of from 0.0005 percent to 5 percent, and preferably in an amount of from 0.005 percent to 0.5 percent by weight.

The topical compositions of this invention are indicated for the treatment of dermatitides of various type, psoriasis and allergic conditions which respond to the topical application of anti-inflammatory steroids.

The 17-valerate of 6α,9α-difluoroprednisolone is prepared by treatment of the corresponding diol with a lower alkyl orthovalerate in the presence of an acid catalyst followed by acid hydrolysis of the resulting 17α,21-orthovalerate according to the following scheme:

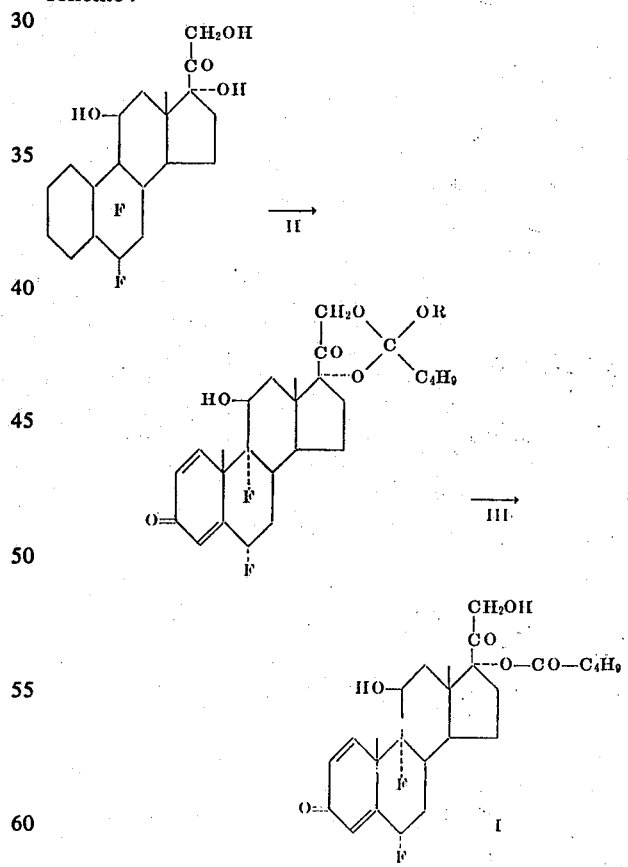

wherein R represents a lower alkyl, preferably methyl.

The orthoesterification step is carried out at a temperature ranging from 60° to 130° C and preferably around 100°–110° C for a period of 8–24 hours, whereby the 17α,21-orthovalerate of formula III forms as a mixture of two epimeric orthoesters. The orthovalerate thus obtained is then hydrolyzed with a mineral or organic acid to give the 17-monovalerate I.

In order further to illustrate this invention, the following Examples are given.

EXAMPLE 1

A mixture of 2 g of $6\alpha,9\alpha$-difluoroprednisolone, 6 cc of methyl orthovalerate and 20 mg of p-toluene-sulfonic acid in 10 cc of dimethylformamide is maintained overnight under nitrogen stream on an oil-bath at 105° C. Then the mixture is neutralized by addition of a few drops of pyridine and concentrated under vacuum to dryness. The residue is taken up with little methanol, filtered and the product crystallized from a methanol-methylene chloride mixture. There is so obtained the $17\alpha,21$-($1'$-methoxy)-n-pentylidenedioxy $6\alpha,9\alpha$-difluoro-$\Delta^{1,4}$-pregnadien-$11\beta$-ol-3,20-dione, which, without further purification, is suspended in 10 cc of methanol, treated with 0.5 cc of an aqueous solution of oxalic acid and heated on water bath at 40°–50° C. When the product is completely passed into solution the mixture is concentrated under vacuum. The residue is then shaken with water, the insoluble product filtered off and then dried. The $6\alpha,9\alpha$-difluoroprednisolone 17-valerate is thus obtained which, when crystallized from acetone-ether, melts at 176°–179° C. Yield : 80 percent.

EXAMPLE 2

Anti-inflammatory activity

The $17\alpha$-valerate of $6\alpha,9\alpha$-difluoroprednisolone was evaluated for its local antiphlogistic effect and for its systemic action in comparison with betamethasone 17-valerate, the compound which is recognized as one of the most topically active anti-inflammatory agents with a low systemic effect.

For this evaluation the recently developed ear irritant test of Tonelli, L.Thibault and I.Ringler (Endocrinology, 77, 625, 1965) was used in order to determine not only the anti-inflammatory potency but also the degree of absorption of the steroid through its effect on thymus weight. The test was performed using Wistar or Sprague-Dawley rats of both sexes weighing about 60 g. The right ears of the rats were treated with a phlogistic agent consisting of 4 parts pyridine, 1 part distilled water, 5 parts diethyl ether and 10 parts 4 percent croton oil in diethyl ether (v/v). Control rats were treated with the above vehicle, topically applied to both sides of the right external ear via curved, felt tipped forceps, until the ear surfaces appeared uniformly moist. Test animals were treated with the same vehicle in which different amounts of the steroid under examination were dissolved. 6 hours later, when the phlogistic response to croton oil was maximal, each animal was lightly etherized and both ears were removed and individually weighed on a torsion balance. The antiphlogistic effect of the test steroid was expressed by the decrease in weight of the right ear. 48 hours after topical application of the materials, the animals were sacrificed and the thymi were removed and weighed on a torsion balance. The weight of the thymus was taken as an index of the systemic effect of the compound.

The results are reported in Table I.

TABLE I

| Compound | Steroid conc. mg/ml vehicle | Right ear wt. (mg) | Thymus wt. (mg) |
|---|---|---|---|
| Control | — | 134.0 ± 5.5 | 136.8 ± 9.3 |
| betamethasone 17-valerate | 0.05 | 121.2 ± 4.5 | 121.8 ± 4.5 |
|  | 0.25 | 127.1 ± 4.7 | 136.2 ± 12.3 |
|  | 1.25 | 118.3 ± 6.1 | 94.1 ± 9.0 |
| difluoroprednisolone 17-valerate | 0.05 | 88.0 ± 3.9 | 118.9 ± 13.1 |
|  | 0.25 | 87.3 ± 5.4 | 99.4 ± 11.1 |
|  | 1.25 | 85.9 ± 2.3 | 37.2 ± 3.9 |

These results show that the 17-valerate of $6\alpha,9\alpha$-difluoroprednisolone possesses a local antiphlogistic effect at least 25 times higher and a systemic effect 5 times higher than betamethasone 17-valerate. These properties differentiate the compound of this invention from the previously known topical anti-inflammatory agents.

EXAMPLE 3

An ointment having the following composition is prepared for external use following accepted pharmaceutical compounding procedures.

| Components | Percent By Weight |
|---|---|
| $6\alpha,9\alpha$-difluoroprednisolone 17-valerate | 0.10 |
| Beeswax | 5.00 |
| Anhydrous lanolin | 5.00 |
| White soft paraffin | 20.00 |
| Amphocerin K (Dehydag, Deutsche Hydrierwerke G.m.b.H.,Düsseldorf) | 25.00 |
| Liquid paraffin | 14.90 |
| Distilled water | 30.00 |

Melt the beeswax, the lanolin, the white soft paraffin and the liquid paraffin at 70° C, add the active ingredient, then the mixture of the Amphocerin K and the water. Refine twice.

EXAMPLE 4

Hydrophilic ointment having the following composition:

| Components | Percent By Weight |
|---|---|
| $6\alpha,9\alpha$-difluoroprednisolone 17-valerate | 0.300 |
| Propylparaben | 0.015 |
| Methylparaben | 0.025 |
| Sodium laurylsulphate | 1.000 |
| Propylene glycol | 12.000 |
| Stearyl alcohol | 25.000 |
| White soft paraffin | 25.000 |
| Distilled water to 100% | |

Melt the stearyl alcohol and the white soft paraffin on a steam bath, and warm to about 75° C, add a solution of the active ingredient in the propylene glycol, then the other ingredients, previously dissolved in the water and warmed to 75° C. Stir the mixture until it congeals.

In the above hydrophilic ointment sodium laurylsulphate can be replaced by polyoxyl 40 stearate in an amount of 5 percent by weight.

EXAMPLE 5

Cream having the following composition:

| Components | Percent By Weight |
|---|---|
| 6α,9α-difluoroprednisolone 17-valerate | 0.050 |
| Cetostearyl alcohol | 12.000 |
| White soft paraffin | 6.480 |
| Liquid paraffin | 6.480 |
| Isopropyl stearate | 3.240 |
| Propylene glycol | 3.240 |
| Methylparaben | 0.180 |
| Propylparaben | 0.050 |
| Tween 80 | 0.200 |
| Polyethylene glycol 6000 | 4.950 |
| Distilled water | 63.130 |

Melt the cetostearyl alcohol, the white soft paraffin, the liquid paraffin and the isopropyl stearate at about 70° C, add a solution of the active ingredient in the propylene glycol, then the other ingredients previously mixed with the water and warmed to 70° C. Refine twice.

EXAMPLE 6

Ointment having the following composition:

| Components | Percent By Weight |
|---|---|
| 6α,9α-difluoroprednisolone 17-valerate | 0.3 |
| Pure cholesterol | 3.0 |
| Stearyl alcohol | 8.0 |
| White soft paraffin | 51.0 |
| Liquid paraffin | 37.7 |

Add the active product to the other ingredients, previously melted at 75° C and stir the mixture until it congeals.

EXAMPLE 7

Ophthalmic ointment having the following composition:

| Components | Percent By Weight |
|---|---|
| 6α,9α-difluoroprednisolone 17-valerate | 0.025 |
| Liquid paraffin | 29.975 |
| White soft paraffin | 70.000 |

Add the active product to the other ingredients, previously sterilized by heating at 120° C for an hour. Refine twice and distribute into sterile tubes.

EXAMPLE 8

An ointment for external use is prepared having the following composition:

| Components | Percent By Weight |
|---|---|
| 6α,9α-difluoroprednisolone 17-valerate | 0.025 |
| Lanolin | 14.450 |
| Liquid paraffin | 17.750 |
| Neomycin sulphate | 0.400 |
| White soft paraffin | 67.375 |

Add the 6α,9α-difluoroprednisolone 17-valerate and the neomycin sulphate to the other ingredients previously melted at 75° C and refine twice.

EXAMPLE 9

Lotion having the following composition:

| Components | Percent By Weight |
|---|---|
| 6α,9α-difluoroprednisolone 17-valerate | 0.03 |
| Ethyl alcohol 95° | 50.00 |
| Propylene glycol | 20.00 |
| Distilled water | 29.97 |

Dissolve the active product in the alcohol and add to a clear mixture of the other ingredients.

We claim:
1. 6α,9α-Difluoroprednisolone 17-valerate.

* * * * *

UNITED STATES PATENT OFFICE
CERTIFICATE OF CORRECTION

Patent No. 3,691,214   Dated September 12, 1972

Inventor(s) Alberto Ercoli and Rinaldo Gardi

It is certified that error appears in the above-identified patent and that said Letters Patent are hereby corrected as shown below:

Column 2, lines 30-40, the structural formula should be amended as follows:

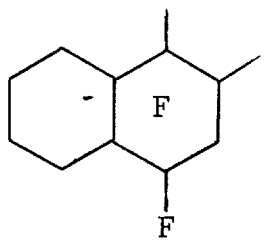   should be   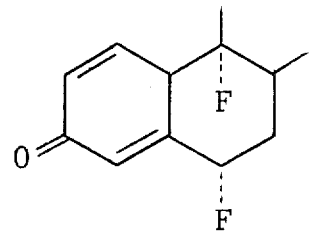

UNITED STATES PATENT OFFICE
CERTIFICATE OF CORRECTION

Patent No. 3,691,214    Dated September 12, 1972

Inventor(s) Alberto Ercoli and Rinaldo Gardi    Page - 2

It is certified that error appears in the above-identified patent and that said Letters Patent are hereby corrected as shown below:

Column 4, lines 1-13, in Table I, the second column should be amended as follows:

| Right ear wt. (mg) | | Right ear wt. (mg) |
|---|---|---|
| 134.0 ± 5.5 | | 134.0 ± 5.5 |
| 121.2 ± 4.5 | | 121.2 ± 4.5 |
| 127.1 ± 4.7 | should be | 127.1 ± 4.7 |
| 118.3 ± 6. | | 118.3 ± 6.1 |
| 88.0 ± 3.9 | | 88.0 ± 3.9 |
| 87.3 ± 5.4 | | 87.3 ± 5.4 |
| 85.9 ± 2.3 | | 85.9 ± 2.3 |

Signed and sealed this 13th day of November 1973.

(SEAL)
Attest:

EDWARD M. FLETCHER, JR.
Attesting Officer

RENE D. TEGTMEYER
Acting Commissioner of Patents